United States Patent [19]

Codding

[11] Patent Number: 4,945,996
[45] Date of Patent: Aug. 7, 1990

[54] RAKE AND SOIL CONDITIONER

[76] Inventor: Charles B. Codding, 100 S. Pon Dr., Mount Dora, Fla. 32757

[21] Appl. No.: 283,125

[22] Filed: Dec. 12, 1988

[51] Int. Cl.$^5$ .................... A01B 45/00; A01B 51/00
[52] U.S. Cl. .................................. 172/233; 172/247; 56/395; 56/397
[58] Field of Search ............... 172/245, 247, 250, 251, 172/310, 233, 136, 198, 607, 609; 56/2, 375, 378, 384, 385, 396, 397, 395

[56] References Cited

U.S. PATENT DOCUMENTS

| | | | |
|---|---|---|---|
| 112,079 | 2/1871 | Sampson | 172/251 |
| 442,031 | 12/1890 | Flanagan | 172/198 |
| 1,206,568 | 11/1916 | Marinier | 172/251 X |
| 1,459,393 | 6/1923 | Gardiner | 172/251 X |
| 2,498,650 | 2/1950 | Crain | 56/395 |
| 2,537,802 | 1/1951 | Thomas | 172/233 X |
| 2,648,946 | 8/1953 | Kelly | 56/385 |
| 2,794,306 | 6/1957 | Blankemeyer | 172/766 X |
| 3,173,497 | 3/1965 | French | 56/385 X |
| 3,478,828 | 11/1969 | Hansen et al. | 172/310 X |
| 3,718,190 | 2/1973 | Perlick | 172/247 X |
| 4,146,096 | 3/1979 | Rocker | 56/375 X |
| 4,217,962 | 8/1980 | Schaefer | 172/326 X |
| 4,396,069 | 8/1983 | Ferber et al. | 172/310 |
| 4,417,747 | 11/1983 | Johnson | 172/310 |

FOREIGN PATENT DOCUMENTS

| | | | |
|---|---|---|---|
| 33683 | 5/1885 | Fed. Rep. of Germany | 172/609 |
| 1285015 | 1/1962 | France | 172/136 |
| 94238 | 7/1959 | U.S.S.R. | 172/251 |

*Primary Examiner*—Randolph A. Reese
*Assistant Examiner*—Jeffrey L. Thompson
*Attorney, Agent, or Firm*—William M. Hobby, III

[57] ABSTRACT

A farm or garden implement capable of raking or soil conditioning as desired comprising a frame movable along the ground as with wheels, a deck for raking having replaceable resilient tines and a deck for soil conditioning having rigid tines. The raking deck and the soil conditioning deck are separate decks which may be interchangeably coupled to the frame. When mounted in the frame, each deck may be remotely raised or lowered. The soil conditioning deck further has a blade extending between the sides of the deck which is vertically adjustable. The raking deck also has a release grid which permits release of leaves and the like when the tines are full, such release possible without interruption to the raking. The implement may be attached to a vehicle by a hitch.

9 Claims, 8 Drawing Sheets

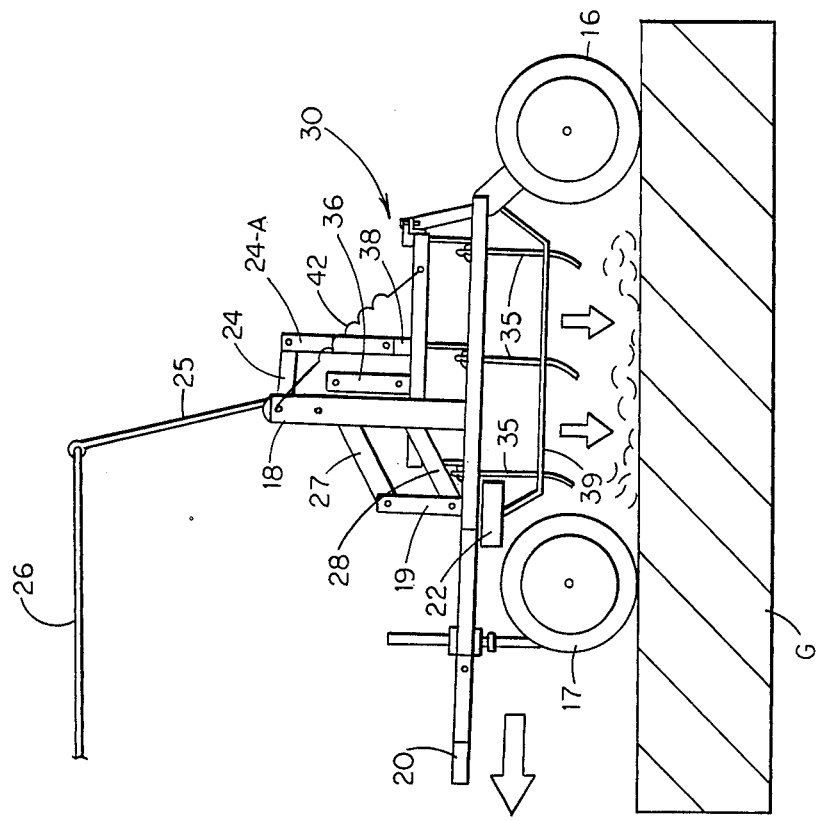
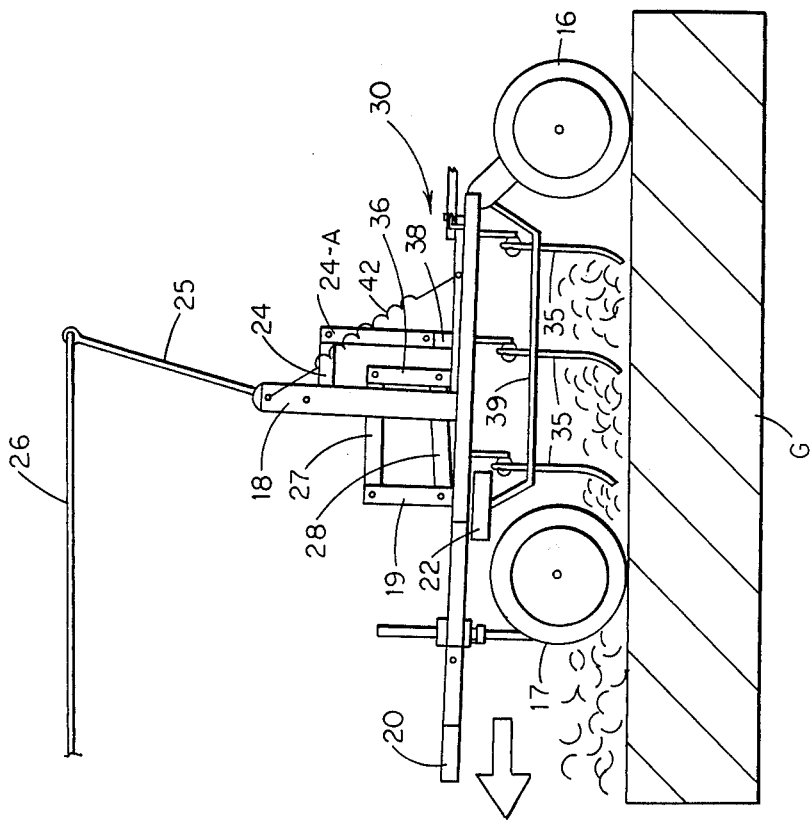

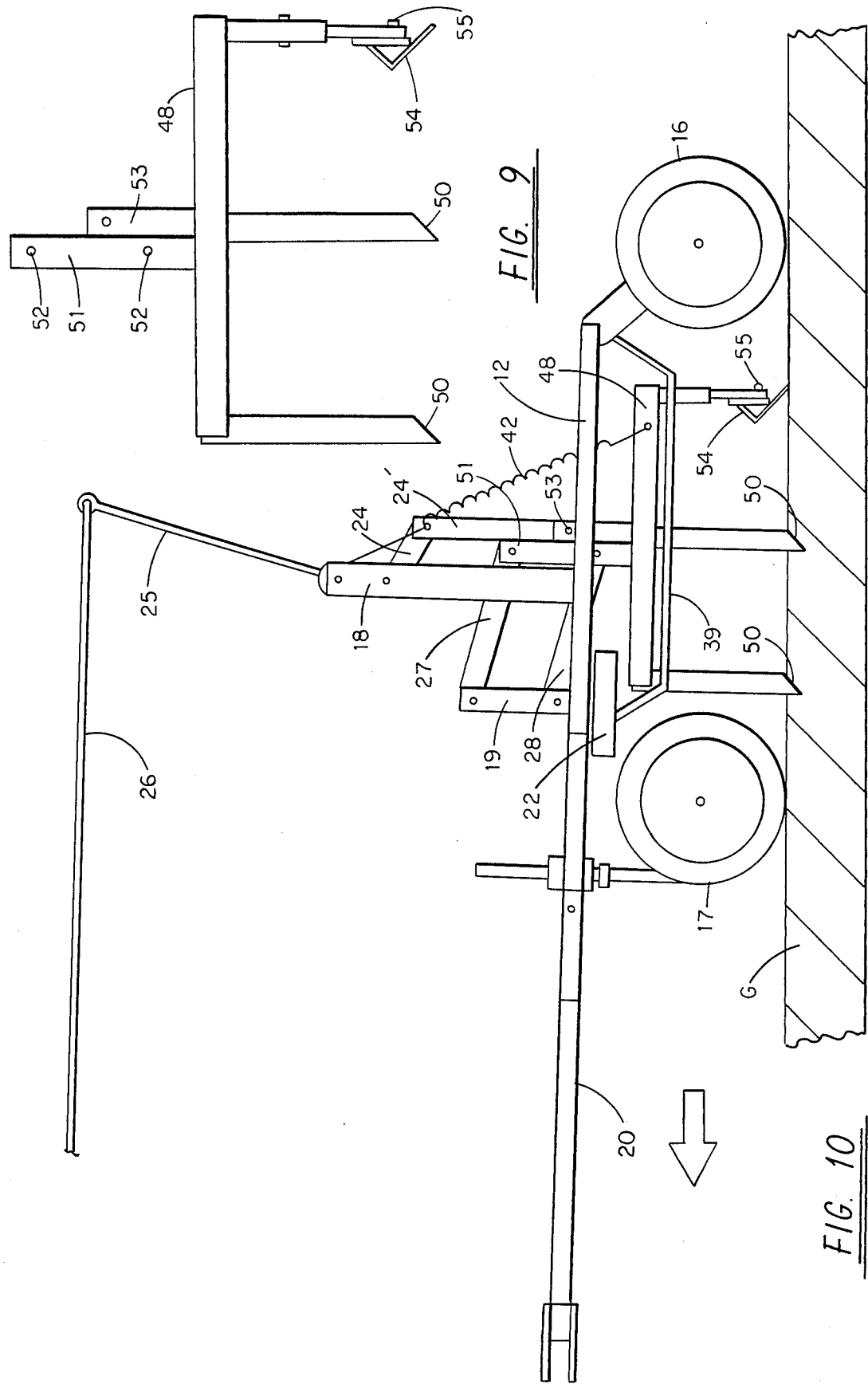

RAKE AND SOIL CONDITIONER

FIELD OF THE INVENTION

The present invention relates to a farm or garden implement for raking and easy removal of leaves, pine needles, grass and the like from a lawn and also for preparation of cleared soil for planting.

BACKGROUND OF THE INVENTION

The average homeowner or professional grounds keeper frequently has occasion to rake landscaped areas, to remove leaves, pine needles, grass clippings and similar material. This can be a laborious, time consuming task if performed by hand. However, the availability of lawn tractors and riding mowers has provided an opportunity to perform these tasks by having a device which can be attached to these vehicles via a hitch pin. Also, it is possible for the attached device to be capable of being convertible to a second function, for example, as a soil conditioner.

A multipurpose landscaping device was disclosed in U.S. Pat. No. 3,718,190 issued to *Perlick*. This device performs the simultaneous functions of rolling, raking, pulverizing and leveling of soil. It comprises a roller and spiked downward extending teeth attached to a horizontal I-beam. Examples of other devices for soil conditioning can be found in U.S. Pat. No. 2,794,306 issued to *Blankemeyer* and U.S. Pat. No. 4,217,962 issued to *Schaefer*. These devices are not multi-functional and have no raking capabilities.

Thus, despite the existence of lawn and garden vehicles with towing capabilities, there has been very limited progress in having a device which can be attached to these vehicles and can reduce the labor of homeowners and professional grounds keepers in raking and in conditioning of soil.

SUMMARY OF THE INVENTION

Accordingly, it is the primary object of the present invention to alleviate the deficiencies of the prior art by providing a farm or garden implement that can serve the function of a raking device and a soil conditioning device.

It is another object of the present invention to provide a farm or garden implement in which means for raking and means for soil conditioning are interchangeable and a selection may be made between the means.

It is yet another object of the present invention to provide a farm or garden implement in which the raking means may be raised and lowered from a fully raised to a fully lowered position and all intermediate positions therebetween. It is a further object that the raking means may be raised or lowered by remote operation.

It is a still further object of the present invention to provide a release grid so that the raking means may be emptied remotely enabling continuous, uninterrupted raking operations.

In accordance with the teachings of the present invention there is disclosed a farm or garden implement capable of raking or soil conditioning which has a frame which can be moved along the ground. The frame has an opening for mounting a rake means and a soil conditioning means therein. The rake means and the soil conditioning means are interchangeable and a selection may be made between the rake means and the soil conditioning means. The implement may have wheels carried on axles for ease of maneuverability. The implement may also have at least two bumper wheels mounted horizontally on the frame such that the bumper wheels may direct the implement around obstacles.

In a preferred embodiment, the center point of the frame is connected to a hitch which may be connected to a vehicle for pulling the implement.

The raking means comprises a rectangular deck having a first side and a second side. At least one bar extends transversely between the first side and the second side. The bar has a plurality of spaced-apart resilient tines mounted thereon and extending downwardly therefrom. The resilient tines may be replaceable. The deck may be raised and lowered from a fully raised to a fully lowered position and all intermediate positions therebetween.

The soil conditioning means comprises a rectangular deck having a back, a first side and a second side. At least one bar extends transversely between the first side and the second side. The bar has a plurality of spaced-apart rigid tines mounted thereon which extending downwardly therefrom for engagement of the soil. The back of the deck further has a blade mounted thereon which extends transversely between the sides of the deck. The blade is vertically adjustable such that the blade may level soil which is cultivated by the rigid tines.

In a preferred embodiment, the frame has a pair of first vertical frame members mounted on the first side and the second side of the frame respectively. The vertical frame members each have an upper end and a lower end. An upper arm is pivotally connected to the upper end of each vertical frame member and a lower arm is pivotally connected to the lower end of each vertical frame member. The upper and lower arms each have an end extending backwardly from the vertical frame member. The end of each upper arm and each lower arm has a circular opening therein. The rake means and the soil conditioning means are interchangeable components, each having a rectangular deck which fits within the frame. Each deck has a respective first side and a second side, the deck further has a vertical member attached to each side thereof. Each vertical member extends upwardly from the respective side of the deck, each vertical member has two circular openings therein. The circular openings communicate with circular openings in each of the upper and lower arms extending backwardly from the first vertical frame member. Pin members removably engage the circular openings in the respective vertical deck members and the arms for connecting the frame to the deck of the interchangeable component. The frame further has a pair of second vertical frame members each having a first end and a second end. The first end of each of the second vertical frame members is attached respectively to the first side and the second side of the frame backwardly of the first vertical frame members. The second end of each of the second vertical frame members extends upwardly beyond the upper end of each first vertical frame member. A bar connects the second end of each of the second vertical frame members, the bar extending transversely therebetween. The bar further has a pair of arms, a first arm connected near the first end of the bar and a second arm connected near the second end of the bar. The arms extend downwardly to the deck of the interchangeable component. The bar is removably connected to the deck. Removal of the pin members from the circular openings and the releasable connection from the arms permits disconnection of one of the interchangeable components and replacement with the second of the interchangeable components.

The rake component further comprises a release grid having a plurality of spaced-apart parallel rods extending downwardly from the front of the deck. The rods extend to the plane of the axle of the wheels and then the rods extend backwardly and upwardly to the back of the frame. The deck may be raised and lowered without obstruction of the tines by the release grid. When the deck is in a lowered position and the tines have raked leaves, grass and the like, the deck may be raised. The leaves, grass and the like are engaged by the release grid, are prevented from being raised and are deposited beneath the device. This grid permits remote emptying of the device and enables continuous, uninterrupted raking operation.

BRIEF DESCRIPTION OF THE DRAWINGS

FIG. 6 is a side elevation showing the implement in use as a rake with the deck in the lowered position to collect leaves, pine needles, grass clippings and the like.

FIG. 7 is a side elevation showing the implement in use as a rake with the deck in the raised position with the leaves, pine needles, grass clippings and the like deposited on the ground after engaging the grid release.

FIG. 9 is a side elevation of the soil conditioning deck showing the rigid tines and the leveling blade.

FIG. 10 is a side elevation of the implement showing the soil conditioning embodiment engaging the ground.

BRIEF DESCRIPTION OF THE PREFERRED EMBODIMENTS

Figure 1:
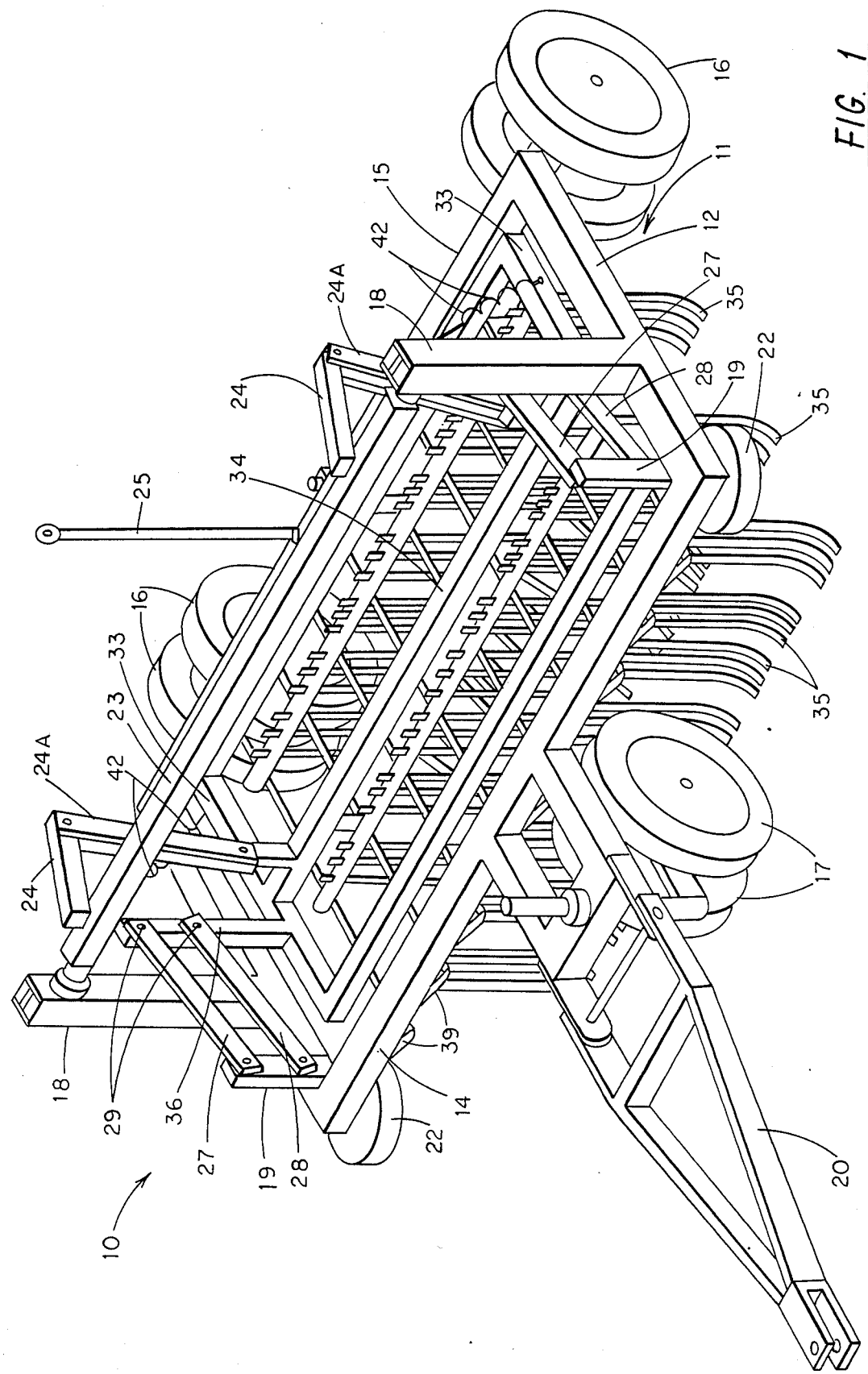
FIG. 1 is a perspective view of the implement showing the rake embodiment mounted in the frame.
Figure 2:
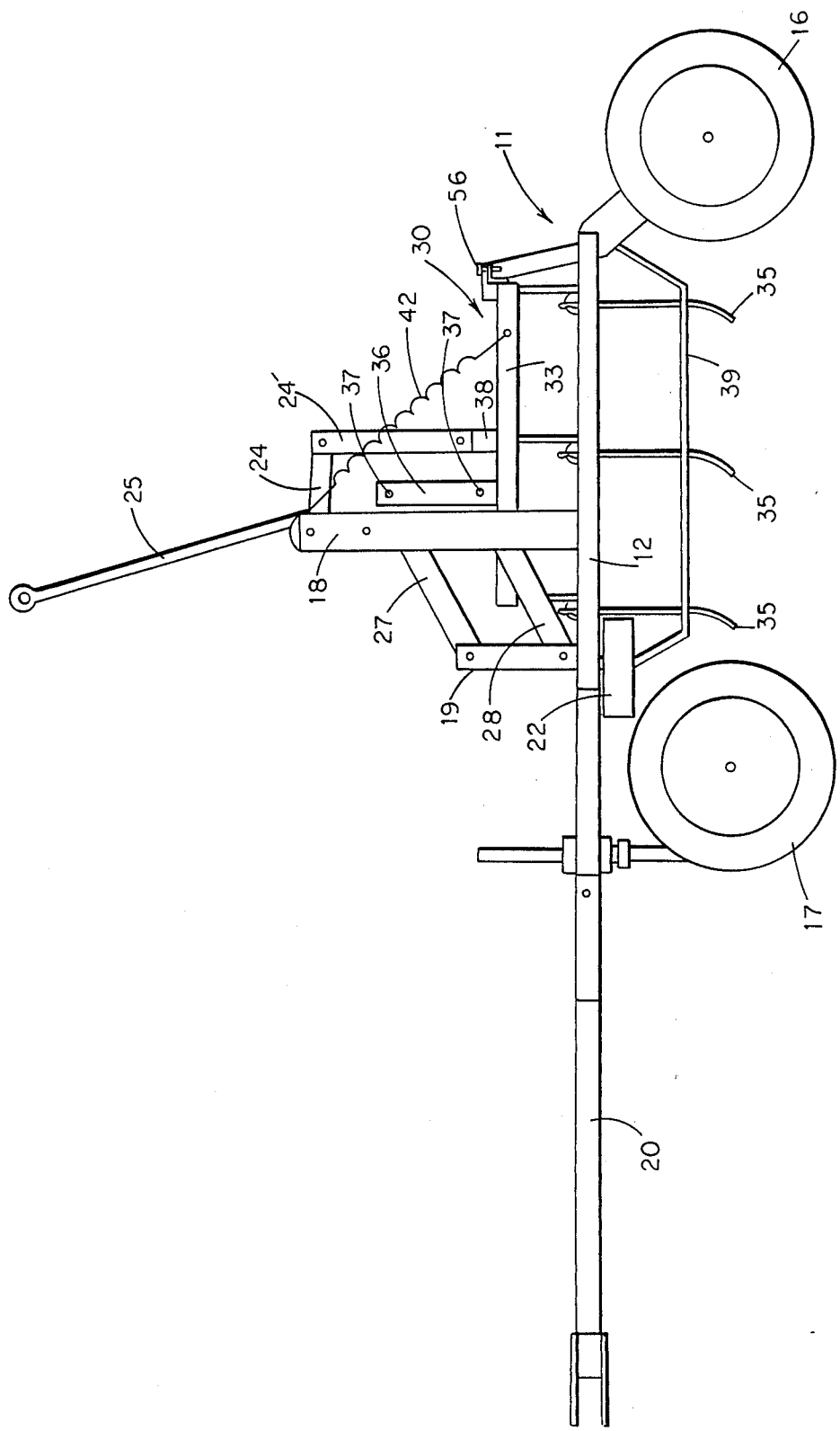
FIG. 2 is a side elevation view of the implement showing the rake embodiment mounted in the frame.
Figure 3:
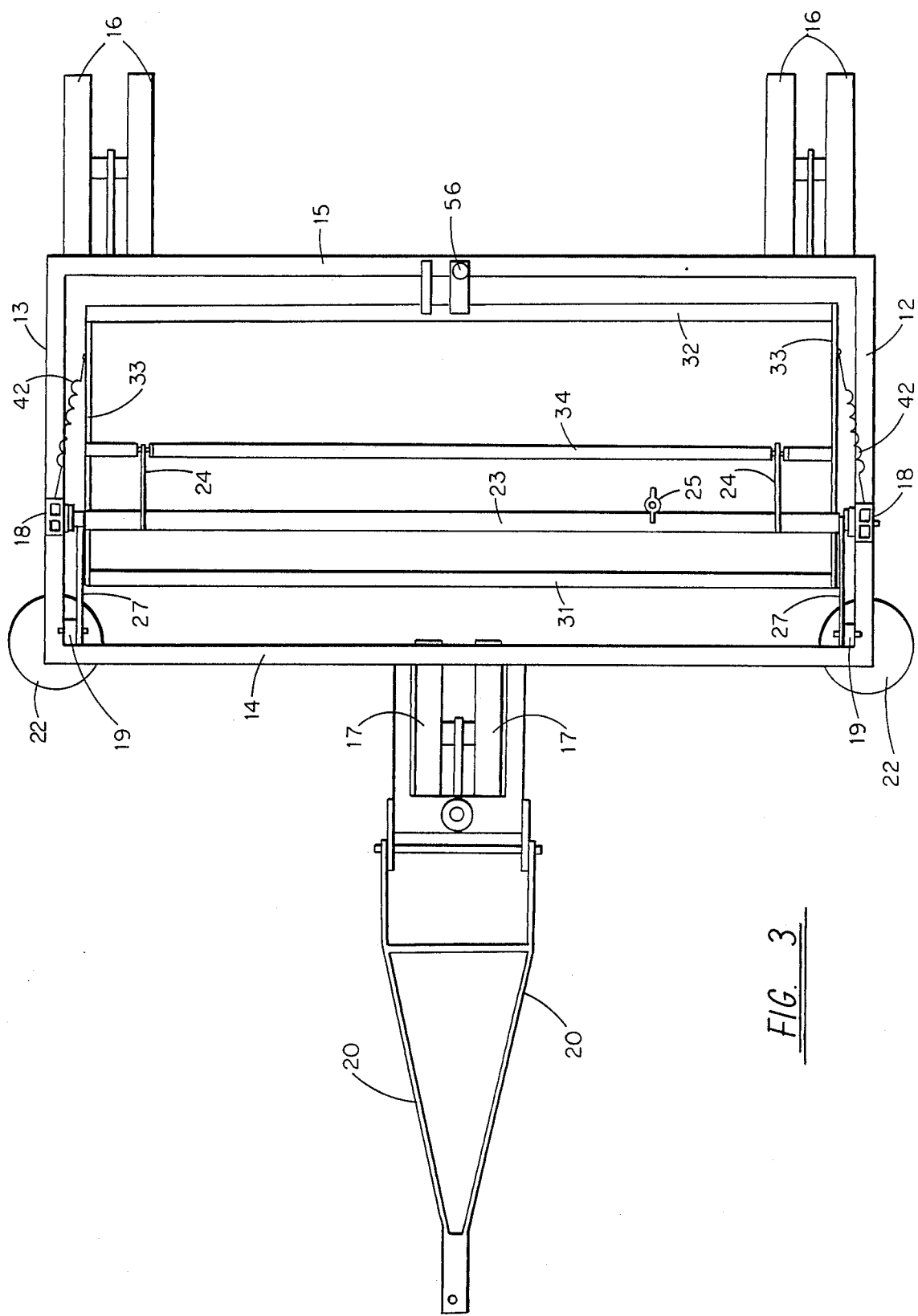
FIG. 3 is a top view of the implement showing the rake embodiment mounted in the frame with the tines and grid release omitted for clarity.
Figure 4:
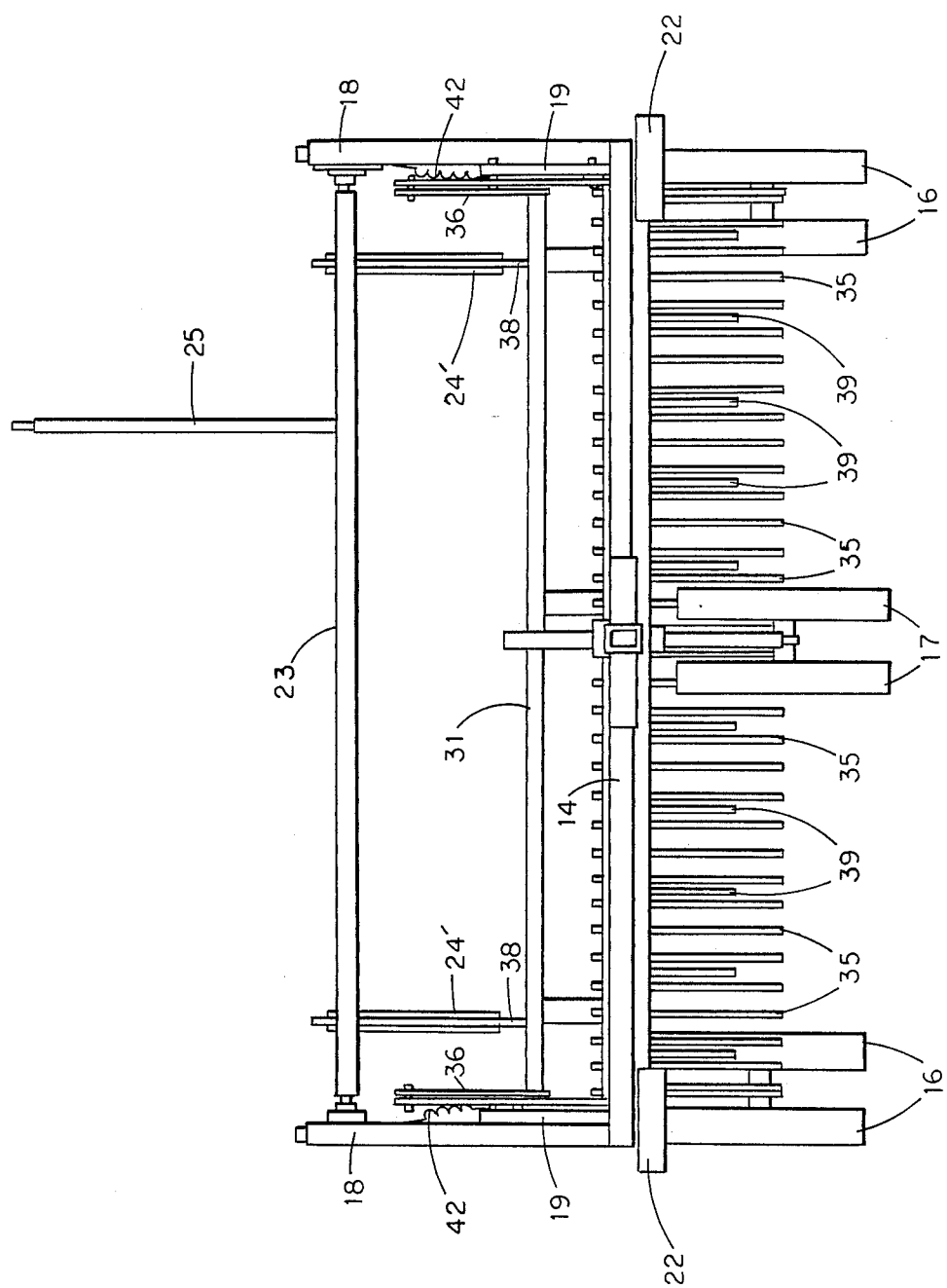
FIG. 4 is a front view of the implement showing the rake embodiment mounted in the frame.

With reference to FIG. 1-5, there is illustrated the rake embodiment of the farm or garden implement 10 capable of raking or soil conditioning. The frame 11 is supported from the ground with a pair of wheels 16 on axles carried by the back of the frame 15 near the first side of the frame 12 and the second side of the frame 13 respectively and a front wheel 17 rotatably carried by the center of the front of the frame 14. Preferably, these wheels may be a pair of wheels at each position. Also attached to the front of the frame 14 is a hitch 20 for pulling or towing the device 10 by a vehicle such as a lawn tractor or riding mower. The hitch 20 is connected to the vehicle by a hitch pin 21 or other similar means. The hitch 20 is connected to the center of the front of the frame 14 above the front wheel 17 so that steering and maneuvering of the device 10 is facilitated.

Also mounted horizontally on each side of the frame 11 are a pair of bumper wheels 22. Preferably these bumper wheels 22 are positioned at the juncture of the front of the frame 14 with each side of the frame 12, 13. In this way, during use, the bumper wheels 22 engage any large obstacles such as trees and redirect the device 10 away from the obstacle.

The frame 11 also has a vertical member 18 attached to the first side of the frame 12 and the second side of the frame 13 and extending upwardly therefrom. A bar 23 extends transversely between the vertical members 18 and is rotationally connected to each vertical member 18. The bar 23 has an arm 24 extending horizontally and a member 24 extending downwardly therefrom near each vertical member 18.

The frame 11 additionally has another pair of vertical frame members 19 extending upwardly. These members 19 are connected to the frame 11 on the front side 14 near the first side of the frame 12 and near the second side of the frame 13. The vertical members 18 extend upwardly beyond the upper ends of the vertical members 19. Pivotally connected to each vertical frame member 19 are an upper arm 27 and a lower arm 28. Each arm 27, 28 has a circular opening 29 in the end which extends backwardly from the vertical frame member 19.

Figure 5:
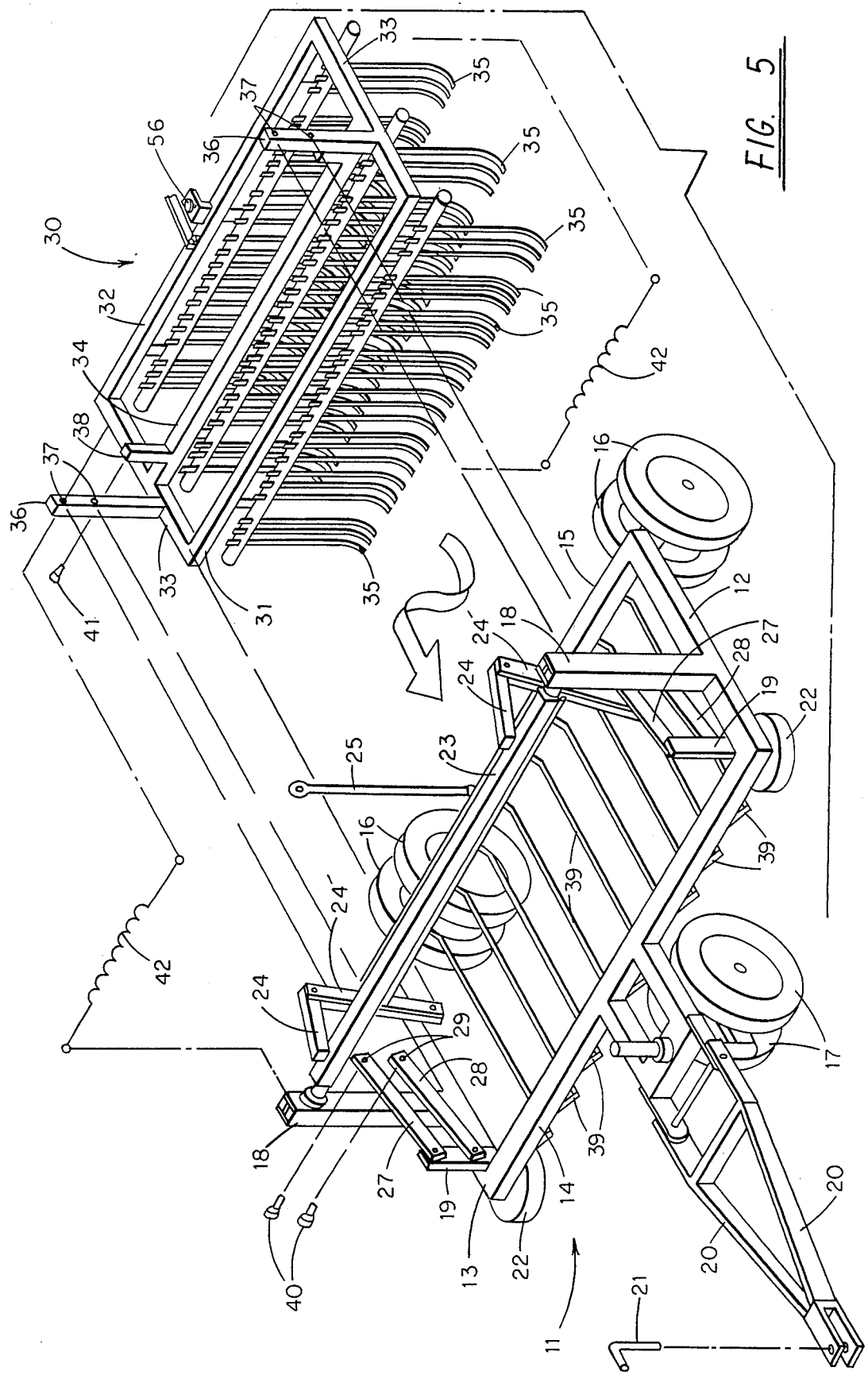
FIG. 5 is a perspective exploded view showing the rake embodiment dismounted from the frame and illustrating the connectors whereby the deck is releasably connected to the frame.

As more clearly shown in FIG. 5, the rake means comprises a rectangular deck 30 which is mounted within the frame 11. The deck 30 has a front 31, back 32, two sides 33 and at least one bar 34 extending transversely between the sides 33. The deck has a plurality of spaced-apart resilient tines 35 extending downwardly from the bar 34. Preferably the rake means comprises three parallel transverse bars 34 (which may include the front 31 and the back 32) with the corresponding plurality of resilient tines 35 for efficient raking of leaves, pine needles, grass clippings and the like. The deck 30 also has a pair of vertical members 36; one member mounted on each side of the deck 33 and extending upwardly therefrom. Each vertical member 36 further has two circular openings 37 therein. In addition the transverse bar 34 has a pair of vertical members 38 connected to the bar, one near each side of the deck 33 and extending upwardly therefrom.

The deck 30 is removably mounted within the frame 11 as shown in FIG. 5. The circular openings 37 in the vertical deck member 36 are pivotally connected to the corresponding circular openings 29 in the ends of the arms 27, 28 of the frame 11. Pin members such as bolts and nuts 40 or similar connectors may be used. Also, the deck vertical members 38 are connected to the arms 24 which extend downwardly from the bar 23 of the frame 11. A spring clip 41 or other similar easily removable connector may be used.

FIGS. 6 and 7 show the use of the implement 10 used as a rake. These figures also illustrate the remote raising and lowering of the rake deck 30 and the emptying of the rake when it is full of leaves and the like. The bar 23, which is rotationally connected to the vertical frame members 18, also has a rod 25 attached perpendicularly thereto, having an end extending upwardly therefrom. A flexible line 26 such as a rope or cable is attached to the end of the rod 25 and extends to the vehicle. The operator may control the raising and lowering of the deck 30 by pulling or releasing the flexible line 26. Pulling the flexible line 26 toward the front of the frame 14, rotates the bar 23 and raises the arms 24, 24'. This raises the deck 30 which also raises the vertical frame members 36. The arms 27, 28 pivot and maintain the deck 30 in the proper attitude. Release of the flexible line 26 allows the bar 23 to rotate in the reverse, lowered direction. A pair of springs 42 connected between the upper ends of each frame member 18 and each side of the deck 33 facilitate positioning the deck.

Another feature of the implement 10 is the release grid 39. The release grid 39 is a plurality of spaced-apart parallel rods which extend downwardly from the front of the frame 14 to the plane of the axle of the wheels and extend backwardly toward the back of the frame 15. The rods then extend upwardly and connect to the back of the frame. The deck 30 may be raised and lowered without obstruction of the tines 35 by the release grid 39. When the deck 30 is in the lowered position and leaves and the like have been collected, the deck 30 may be raised. The leaves and the like are engaged by the release grid 39, are prevented from being raised and are deposited beneath the device 10. This is illustrated in FIGS. 6–7. In this manner, the remote emptying of the device 10 can be achieved enabling continuous, uninterrupted raking operation.

The rake deck 30 may be adjusted to vary the height of the deck above the frame 11. This in turn, will determine the distance between the resilient tines 35 and the surface of the ground G in the case of the rake deck. This height adjustment is accomplished with a rotatable pin 56 mounted on the back of the respective interchangeable implement, that is, the rake deck 30 or the soil conditioner deck 45. The pin 56 contacts the surface of the back of the frame 15 so that the respective deck height can be selected to the desired position.

Figure 8:
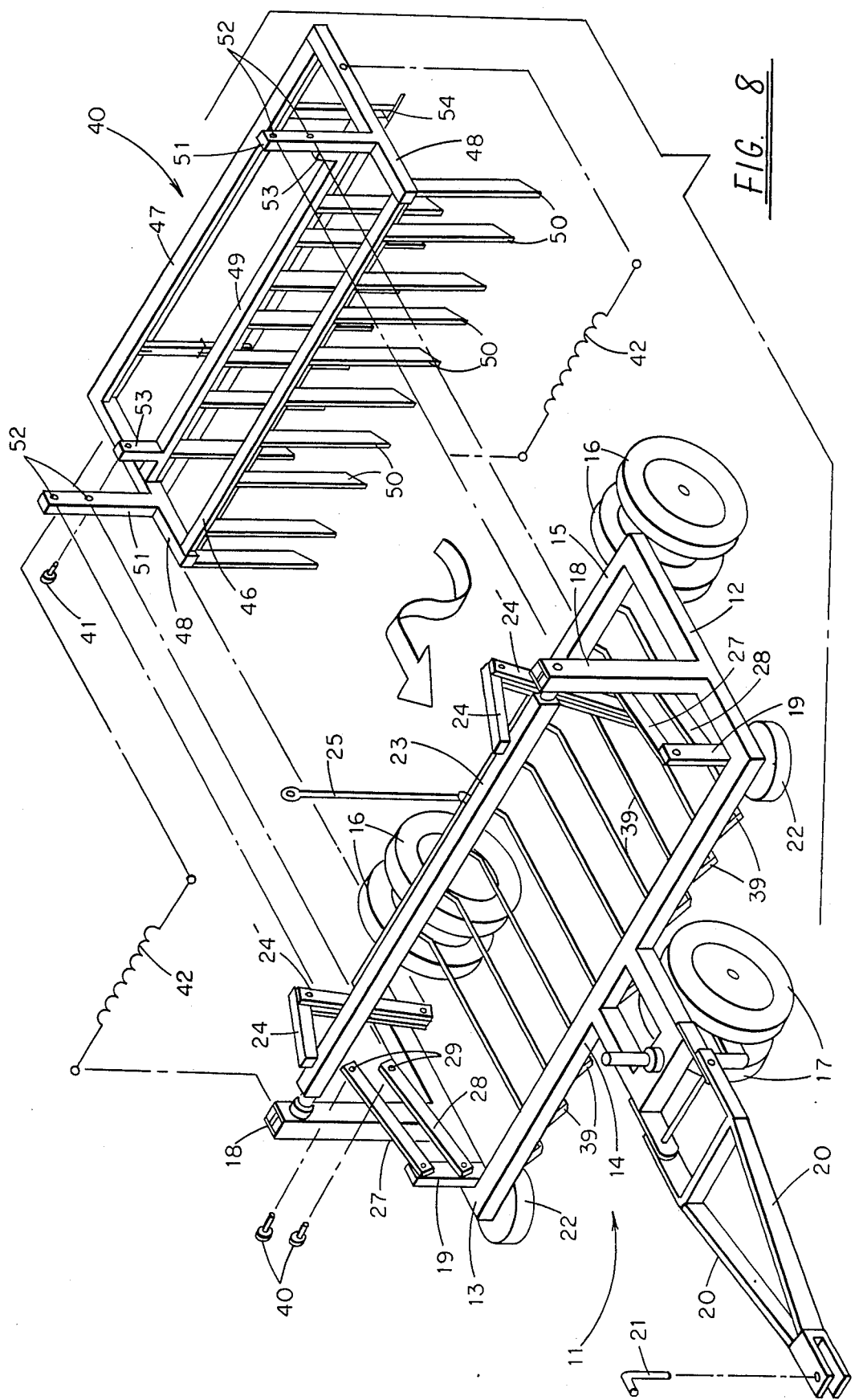
FIG. 8 is a perspective exploded view showing the soil conditioning embodiment dismounted from the frame and illustrating the connectors whereby the deck is releasably connected to the frame.

FIG. 8 shows the rectangular soil conditioner deck 45 removed from the frame 11. FIG. 10 shows the implement 10 with the soil conditioner embodiment mounted in the frame 11. The deck 45 has a front 46, back 47 and sides 48 comparable to the construction of the rake deck 30. At least one bar 49, and preferably two bars, extends transversely between the sides 48. The bar 49 has a plurality of rigid tines 50 extending downwardly from the bar. The deck has a pair of vertical members 51, one member mounted on each side of the deck 48 and extending upwardly therefrom (FIG. 9). Each vertical member 51 further has two circular openings 52 therein. In addition, the transverse bar 49 has a pair of vertical members 53 connected to the bar, one near each side of the deck 48 and extending upwardly therefrom. The soil conditioning deck 45 and the rake deck 30 are similar in construction and may be considered as interchangeable implements to be mounted in the frame. The means of attachment of the soil conditioning deck 45 to the frame 11 is identical to that of the rake deck 30 as described.

There is an additional difference between the rake deck 30 and the soil conditioning deck 45. The soil conditioning deck 45 has a blade 54 mounted on the back of the deck 47 and extending transversely between the sides of the deck 48. The blade 54 is vertically adjustable to a desired height by means of pins 55 such as removable bolts. The blade 54 is used to smooth broken soil, if desired, as the device 10 tills the ground. The blade 54 may also be used for automatically covering planted seeds or other uses.

Use of the implement 10 including the soil conditioner deck 45 is shown in FIG. 10. The vehicle tows the device 10 in the direction indicated. The rigid tines 50 engage the ground G and cut a series of parallel furrows in the soil. The blade 54 is capable of leveling the broken soil but may be raised if desired so as to leave the furrows undisturbed. In FIG. 10, the rod 25 is in its full backward position so that the deck 45 is fully lowered and engaging the ground G. The flexible line 26 is shown extending from the rod 25 to the vehicle so that remote raising of the deck 45 is possible.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A lawn or garden implement capable of raking or soil conditioning as desired comprising:

a frame movable along the ground, the frame having an opening formed therein, said frame having a first side, a second side, a back and a front, the front further having a center point;

a rake means;

a soil conditioning means; and a coupling means to mount the rake means and the soil conditioning means within the frame such that the rake means and the soil conditioning means are interchangeable and a selection may be made between the rake means and the soil conditioning means, said coupling means comprising: the frame having a pair of first vertical frame members mounted on the first side and the second side of the frame respectively; the vertical frame members each having an upper end and a lower end; an upper arm pivotally connected to the upper end of each vertical frame member and a lower arm pivotally connected to the lower end of each vertical frame member; the upper and lower arms each having an end extending backwardly from the vertical frame member; the end of each upper arm and each lower arm having a circular opening therein; the rake means and the soil conditioning means being a first and a second interchangeable component; each interchangeable component having a rectangular deck which fits within the frame, the deck having a respective first side and a second side, the deck further having a vertical member attached to each side thereof, each vertical member extending upwardly from the respective side of the deck, each vertical member having two circular openings therein, the circular openings communicating with circular openings in each of the upper and lower arms extending backwardly from the first vertical frame member; pin members removably engaging the circular openings in the respective vertical deck members and the arms for connecting the frame to the deck of the selected interchangeable component; the frame further having a pair of second vertical frame members each having a first end and a second end; the first end of each of the second vertical frame members being attached respectively to the first side and the second side of the frame backwardly of the first vertical frame members; the second end of each of the second vertical frame members extending upwardly beyond the upper end of each first vertical frame member; a bar having a first end and a second end, each end being connected to the second end of each of the second vertical frame members the bar extending transversely therebetween; the bar further having a pair of arms, a first arm connected near the first end of the bar and a second arm connected near the second end of the bar, members extending downwardly from the first and second arms to the deck of the selected interchangeable component; the members being releasably connected to the deck; such that removal of the pin members from the circular openings and the releasable connection between the member and the deck permits disconnection of one of the interchangeable components and replacement with the other of the interchangeable components.

2. The implement of claim 1, wherein a first axle having a wheel mounted thereon is carried by the back of the frame near the first side of the frame, a second axle having a wheel mounted thereon is carried by the back of the frame near the second side of the frame and a third axle with a wheel mounted thereon is rotatably carried by the center point of the front of the frame such that the device follows the contours of the terrain and is easily maneuverable.

3. The implement of claim 2, wherein the wheels on the first axle, on the second axle and on the third axle are a pair of wheels at each position.

4. The implement of claim 1, further comprising at least two bumper wheels, one bumper wheel mounted horizontally on the first side of the frame and a second bumper wheel mounted horizontally on the second side of the frame, such that the bumper wheels may engage trees and large objects and redirect the device around these obstacles.

5. The implement of claim 1, wherein the frame is connected to a vehicle, the connection comprises a hitch having a first end and a second end, the first end mounted to the center point of the front of the frame and the second end extending outwardly therefrom and having a connector for connection to the vehicle.

6. The implement of claim 1, wherein the rake means comprises a rectangular deck having a first side and a second side, and further having at least one bar extending transversely between the first side and the second side, the bar having a plurality of spaced apart resilient tines mounted thereon and extending downwardly therefrom.

7. A lawn or garden implement capable of raking leaves, pine needles, grass and the like comprising:
a frame movable along the ground, the frame having an opening formed therein;
means for attaching the implement to a vehicle;
three wheels carried by the frame;
a rectangular deck having a first side and a second side, a front and a back further having three bars extending transversely between the first side and the second side, each bar having a plurality of spaced-apart resilient tines extending downwardly therefrom, the deck being removably mounted within the frame; and
means for remotely raising and lowering the deck from a fully raised position to a fully lowered position and all intermediate positions therebetween, said means for remotely raising and lowering the deck comprising: the frame having a pair of first vertical frame members mounted on the first side and the second side of the frame respectively; the vertical frame members each having an upper end and a lower end; an upper arm pivotally connected to the upper end of each vertical frame member and a lower arm pivotally connected to the lower end of each vertical frame member; the upper and lower arms each having an end extending backwardly from the vertical frame member; the end of each upper arm and each lower arm having a circular opening therein; the deck further having a vertical member attached to each side thereof, each vertical member extending upwardly from the respective side of the deck, each vertical member having two circular openings therein, the circular openings communicating with circular openings in each of the upper and lower arms extending backwardly from the vertical frame member; pin members removably engaging the circular openings in the respective vertical deck members and the arms for connecting the frame to the deck; the frame further having a pair of second vertical frame members each having a first end and a second end; the first end of each of the second vertical frame members being attached respectively to the first side and the second side of the frame backwardly of the first vertical frame members; the second end of each of the second vertical frame members extending upwardly beyond the upper end of each first vertical frame member; a spring connected between the second end of each second vertical frame member and each side of the deck respectively; a bar having a first end and a second end, each end being rotatably connected to the second end of each of the second vertical frame members the bar extending transversely therebetween; the bar further having a pair of arms, a first arm connected near the first end of the bar and a second arm connected near the second end of the bar, members extending downwardly from the first and second arms to the deck; the bar thereby being removably connected to the deck; the bar further having a rod connected perpendicularly thereto, the rod having an end extending upwardly therefrom; a flexible line attached to the upper end of the rod, the flexible line extending to the vehicle; such that movement of the flexible line toward the vehicle, and toward the front of the device, rotates the bar between the second vertical frame members raising the arms connected to the bar and raising the deck, the deck further being supported and stabilized by the upper and lower arms pivotally connected to the first vertical frame members, and movement of the flexible line away from the vehicle and toward the back of the device, lowers the deck which is urged to a position by the springs connected to the second end of each second vertical frame member and by the weight of the deck.

8. A lawn or garden implement capable of raking leaves, pine needles, grass and the like comprising:
a frame movable along the ground, the frame having an openings formed therein;
means for attaching the implement to a vehicle;
three wheels carried by the frame;
a rectangular deck having a first side and a second side, a front and a back further having three bars extending transversely between the first side and the second side, each bar having a plurality of spaced-apart resilient tines extending downwardly therefrom, the deck being removably mounted within the frame;
means for remotely raising and lowering the deck from a fully raised position to a fully lowered position and all intermediate positions therebetween; and
a release grid having a plurality of spaced-apart parallel rods extending downwardly from the front of the deck to the plane of the axle of the wheels, the rods extending backwardly and extending upwardly to the back of the frame such that the deck may be raised and lowered without obstruction of the tines by the release grid and further such that when the deck is in a lowered position and the tines having raked leaves, grass and the like, the deck may be raised and the leaves, grass and the like are engaged by the release grid and are prevented from being raised and are deposited beneath the device, permitting remote emptying of the device and enabling continuous, uninterrupted raking operation.

9. The rake implement of claim 8, wherein the height adjustment comprises a rotatable pin mounted on the back of the deck, a plurality of apertures provided in the back of the frame, the pin engaging the back of the frame in a selected aperture such that the deck height above the frame may be selected to a desired position whereby the tines are disposed a selected distance above the ground.

* * * * *